L. ZINK.
ADJUSTMENT FOR BRAKE SHOES.
APPLICATION FILED APR. 13, 1911.
996,823.
Patented July 4, 1911.
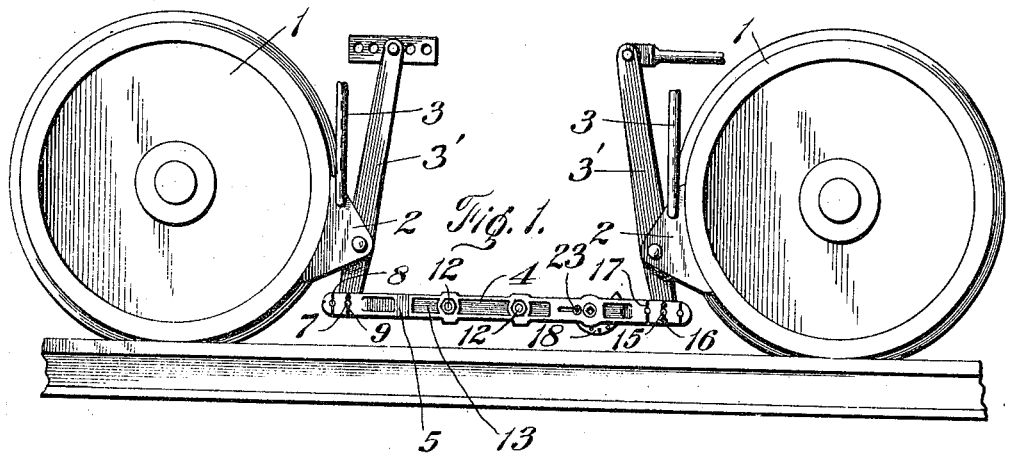
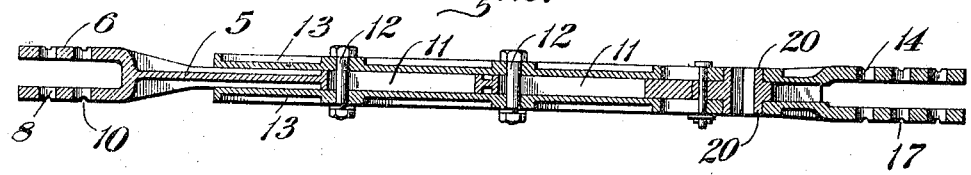
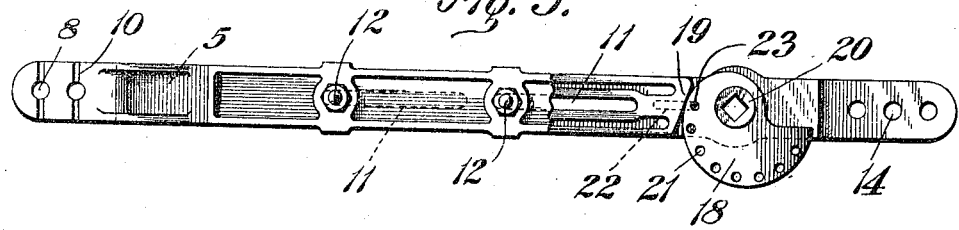
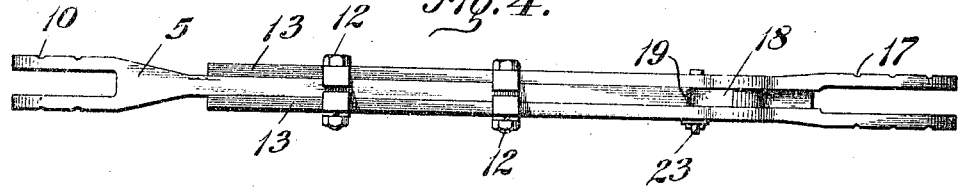
Witnesses
Chas W. Stauffiger
Anna C. Rowler
Inventor
LUZIAN ZINK.
By Barthel & Brandt
Attorneys.

UNITED STATES PATENT OFFICE.

LUZIAN ZINK, OF DETROIT, MICHIGAN.

ADJUSTMENT FOR BRAKE-SHOES.

996,823.   Specification of Letters Patent.   Patented July 4, 1911.

Application filed April 13, 1911. Serial No. 620,753.

*To all whom it may concern:*

Be it known that I, LUZIAN ZINK, a citizen of the United States of America, residing at Detroit, in the county of Wayne and State of Michigan, have invented certain new and useful Improvements in Adjustment for Brake-Shoes, of which the following is a specification, reference being had therein to the accompanying drawings.

In adjusting the levers, hangers or like portions which carry the brake beams or brake shoes of a car truck, it is usual to arrange them to take up for wear or the like by means of a spacing member connecting their free ends, and having a turnbuckle or other screwthreaded adjusting sleeve for obtaining the necessary extension or contraction desired. Such devices frequently work loose under the jar of the running truck and throw the connected parts out of adjustment.

This invention relates to a brake attachment for holding brake hanger arms, levers, links or the like in proper position together with means for varying the length of the adjusting member to fit different trucks and to compensate for wear when once in place.

The invention also includes means for positively holding the adjustment in proper position regardless of any jars or tremors imparted to it by the truck.

The invention consists in the matters hereinafter set forth and more particularly pointed out in the appended claims.

In the drawings, Figure 1 is a view in side elevation of an adjustment embodying features of the invention, mounted on a railway truck portions of which are shown diagrammatically; Fig. 2 is a view in longitudinal section through the adjustment; Fig. 3 is a view in side elevation of the adjustment partially broken away; and Fig. 4 is a plan view of the adjustment.

As herein indicated, a pair of truck wheels 1 has brake shoes 2 shown diagrammatically, that may be mounted in any preferred manner, as for example, on hangers or arms 3, swinging from the body of the truck, the latter not being shown. The adjustment 4 connects the lower ends of the brake levers 3' to hold them in such relation that the brake shoes 2 operate properly upon the wheels 1 when power is applied thereto.

As herein shown in preferred form, the adjustment consists of an inner bar 5, suitably ribbed and flanged for strength and lightness, having a bifurcated end 6 adapted to embrace one of the brake levers 3' to which it is connected by a pivot pin 7 passing through either one of a pair of apertures 8 in the forked end. The pivot pin is preferably secured in place by cotters 9 which engage transverse grooves 10 in the outer faces of the arms of the forks 6 and thereby prevent the pin from turning and wearing on the member 5. The member 5 has longitudinal slots 11 which are engaged by clamping bolts 12 passing through similar oppositely disposed side members 13 whose separated ends beyond the member 5 are adapted to embrace the other brake lever 3' and have a series of apertures 14 for holding a pivot pin 15 that passes through the lever 3', cotters 16 holding the pin and engaging grooves 17 to prevent the pin from turning.

A cam plate 18 is journaled between the separated plates 13 to bear against the beveled end 19 of the adjustment member 5. Preferably the cam turns on oppositely disposed bosses 20 engaging alined openings in the members 13. A series of holes 21 near the periphery of the cam may be brought severally into register with a longitudinal slot indicated at 22 in the members 13 and a locking pin 23 is thrust therethrough to hold the cam in adjusted position. For convenience the hub or bosses 20 of the cam have a square or angular aperture for the insertion of the stem of a wrench. As a result of this construction the adjustment is obtained which may be quickly secured in place and the parts brought to proper working position by turning the cam thereby projecting the inner member until the required position of the brake shoes is obtained. By setting up the clamping bolts and placing the locking pin in position in the cam the adjustment is held positively so that it cannot work loose under jars.

Obviously, changes in the details of construction may be made without departing from the spirit of the invention and I do not care to limit myself to any particular form or arrangement of parts.

What I claim is:

1. An adjustment comprising an inner bar, a pair of outer bars in sliding engagement therewith, a cam journaled between the outer bars and adapted to engage the inner end of the inner member, and means for locking the parts in adjusted position.

2. An adjustment for truck brake shoes comprising a single member adapted to be positively secured at one end to a depending member of a truck, a pair of outer members longitudinally adjustable on the inner member adapted to be secured at their outer ends to a depending member of the truck, a cam rotatable between the outer members adapted to shift the inner member longitudinally, and means for locking the parts in adjusted position.

3. An adjustment for truck brake shoes, comprising an inner bar having an outer bifurcated end adapted to be pivotally secured to a truck member, a pair of outer bars held in spaced relation by the inner bar on which they are longitudinally adjustable and adapted at their outer ends for pivotal attachment to a truck member, a cam journaled between the outer bars and adapted to shift the bars longitudinally on each other when turned, and means for locking the bars and cam in adjusted position.

4. The combination with hanging members of a truck, of an adjustment consisting of an inner bar having an outer forked end adapted to embrace one of said truck members and provided with a series of pivot pin holes, outer bars held in spaced relation by the inner bar on which they are longitudinally adjustable, and provided at their outer ends with a series of pivot pin holes, clamping bolts in the outer bars engaging longitudinal slots in the inner bar, a cam having integral bosses journaled in corresponding openings in the outer bars and bearing against the end face of the inner bar, a pin passing through longitudinal slots on the outer bars and any one of a series of pin holes in the cam adapted to be brought into register with the slots, pivot pins passing through the outer ends of the bars and the hanging members of the truck and cotter pins passing through transverse openings in the pivot pins and lying in transverse grooves formed in the respective outer faces of the bar ends.

In testimony whereof I affix my signature in presence of two witnesses.

LUZIAN ZINK.

Witnesses:
   C. R. STICKNEY,
   ANNA C. RAVILER.